Jan. 28, 1930.  H. SCHLAICH  1,745,063
MEANS FOR INTRODUCING TEMPERATURE RESPONSIVE
ELEMENTS INTO ENGINE COOLING SYSTEMS
Filed Jan. 24, 1921
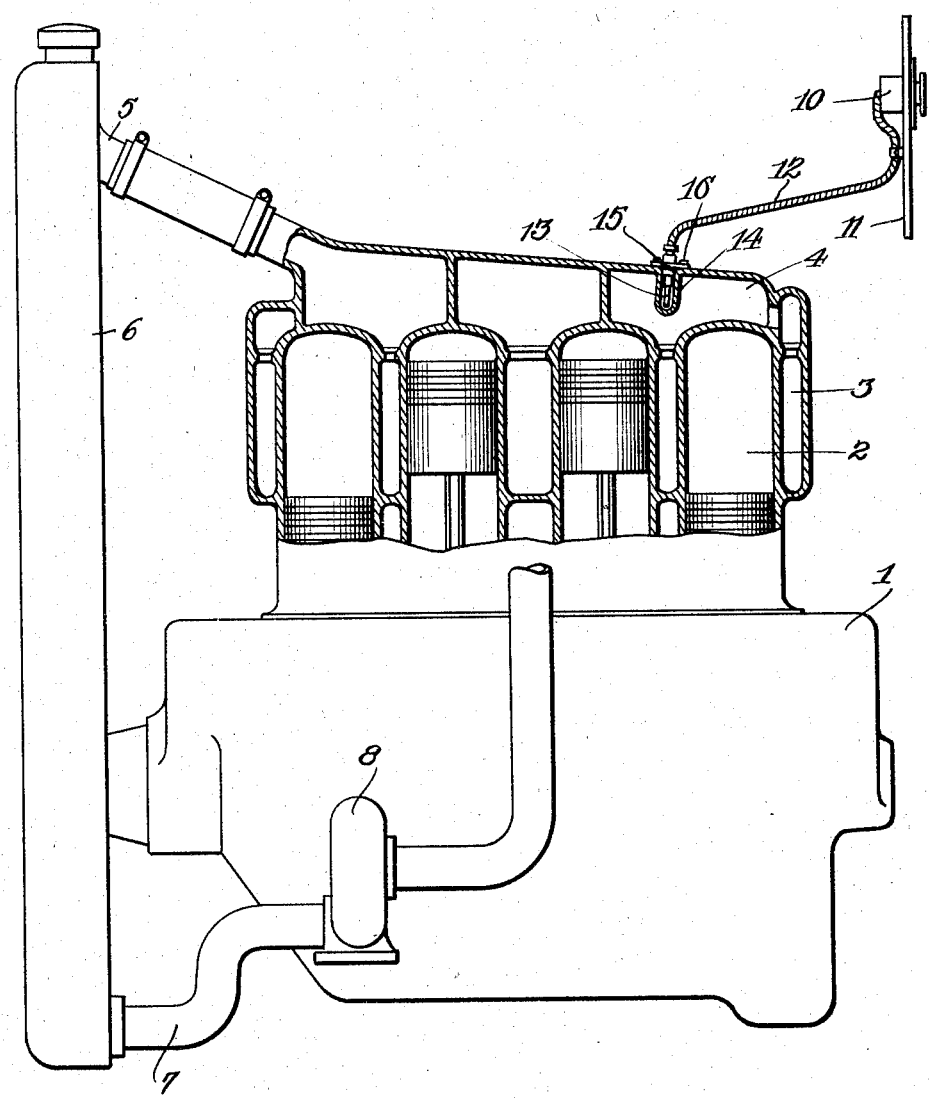

Patented Jan. 28, 1930

1,745,063

UNITED STATES PATENT OFFICE

HERMAN SCHLAICH, OF BROOKLYN, NEW YORK

MEANS FOR INTRODUCING TEMPERATURE-RESPONSIVE ELEMENTS INTO ENGINE-COOLING SYSTEMS

Original application filed April 28, 1919, Serial No. 293,267. Divided and this application filed January 24, 1921. Serial No. 439,546.

This invention relates to means for mounting temperature-responsive elements in connection with the cooling systems of internal combustion engines of automobiles or the like in such a way that the element shall be affected by the temperature of the cooling fluid. The invention is particularly applicable to the mounting of the temperature responsive elements or bulbs of temperature indicating instruments in the cooling systems of the engines of aeroplanes, automobiles or other motor vehicles in accordance with the invention of Patent No. 1,206,783.

It is the principal object of the present invention to provide means for mounting the temperature responsive element in a convenient and effective manner in such a way that the temperature responsive element may be introduced or removed without danger of leakage from the cooling system.

In order to explain the nature of my invention and the manner in which the above and other objects are secured, I have shown a preferred embodiment of the invention as illustrative of the principle thereof and the best mode now known to me for practicing the same.

The present application is a division of my pending application, Serial No. 293,267, filed April 28, 1919, for means for introducing temperature responsive elements into engine cooling systems, now Patent No. 1,366,894.

In the accompanying drawing which forms a part of this specification, there is shown a diagrammatic side elevation partly in section, showing an automobile engine and its cooling system, and illustrating one form in which my invention may be applied in connection therewith.

Referring to the drawing in detail, the numeral 1 indicates an internal combustion engine of an automobile or other vehicle having the cylinders 2, the upper parts of which are enclosed by the water jackets 3 which communicate through the return manifold 4 and return pipe 5 with the radiator 6. The lower part of the radiator is connected by the inlet pipe 7 with the jacket space. A circulation may be produced in the cooling system described by means of the pump 8 or by thermo-siphon action or in any other suitable or well known manner. The water being heated by contact with the engine cylinders in which combustion takes place, passes to the upper part of the radiator, descends through the radiator, and is cooled during such descent, and the cooled water is then carried again into the water jackets through the connections described, where it again performs its cooling function.

As fully explained in the above-mentioned patent to Boyce, No. 1,206,783, it is highly desirable for the operator of a motor vehicle to have means by which he may be kept informed of the thermal condition of the engine, said Boyce patent disclosing instrumentalities for such purpose comprising the use of a temperature-responsive element introduced into the cooling system in such a way as to be affected by the heated water in the system, said temperature responsive element being operatively connected with indicating instrumentalities in position for observation by the operator. In the present instance, I have illustrated temperature indicating means of this character comprising a gauge 10 of suitable construction mounted on the vehicle dash 11 in position to be observed by the driver of the vehicle while driving, and connected by means of a small tube 12 with a temperature responsive element 13 in the form of a bulb containing an expansible fluid.

As shown, the bulb 13 is received within a tubular depression or well 14 cast in the top wall of the return manifold 4, which, in the present instance, is formed as an integral part of the cylinder block or casting. The bulb 13 is introduced into the well 14 and is held in position therein by means of a cover plate 15 secured to the return manifold in any suitable manner, as, for example, by cap screws 16. If desired, the bulb 13 may be surrounded by a filling of graphite and oil or the like. By casting the well or casing as a part of the cylinder block or casting, the utmost simplicity of manufacture is attained and all danger of leakage is eliminated. There is furthermore no danger of cracking the casting as may occur due to the modification of internal stresses which might result from boring a hole in the casting.

While I have illustrated and described in detail one preferred form of my invention, it is to be understood that changes may be made therein and the invention embodied in other structures. I do not, therefore, desire to limit myself to the specific construction illustrated, but intend to cover my invention broadly in whatever form its principle may be utilized.

Having thus described my invention, I claim:

1. The combination of an internal combustion engine having a cylinder casting provided with a water space, said casting being provided with an integral well having a wall of heat conducting material adapted to be contacted by the water in said water space, a bulb containing an expansible fluid located within said well, a tube connected to said bulb, temperature indicating means connected to said tube and responsive to contractions and expansions of the fluid within said bulb, and a cover plate through which said tube passes, secured to said cylinder casting and serving to retain said bulb within said well.

2. The combination of a vehicle motor having a cylinder casting provided with a water space, said casting being provided with an integral well having a wall of heat conducting material adapted to be contacted by the water in said water space, a temperature responsive element located within said well, a distant indicator, means for operating the indicator from the temperature responsive element, and means enclosing and retaining the temperature responsive element in the well.

In testimony whereof I have affixed my signature to this specification.

HERMAN SCHLAICH.